United States Patent [19]
Edwards

[11] Patent Number: 5,353,135
[45] Date of Patent: Oct. 4, 1994

[54] LIQUID CRYSTAL DISPLAY WITH BLACK MATRIX HELD AT A FIXED POTENTIAL WITH A FEEDBACK CIRCUIT

[75] Inventor: Martin J. Edwards, Crawley, United Kingdom

[73] Assignee: U.S. Philips Corporation, New York, N.Y.

[21] Appl. No.: 64,184

[22] Filed: May 19, 1993

[30] Foreign Application Priority Data

May 28, 1992 [GB] United Kingdom ................. 9211283

[51] Int. Cl.⁵ ..................... G02F 1/1343; G02F 1/137
[52] U.S. Cl. ......................................... 359/55; 359/67; 359/84; 359/87; 345/43; 345/87
[58] Field of Search ........................ 359/84, 85, 87, 88, 359/67, 68, 54, 56, 86, 55; 345/52, 43, 101, 211

[56] References Cited

U.S. PATENT DOCUMENTS

| | | | |
|---|---|---|---|
| 4,759,610 | 7/1988 | Yamagisawa | 359/67 |
| 5,157,525 | 10/1992 | Eaton et al. | 359/55 |
| 5,265,273 | 11/1993 | Goodwin et al. | 455/347 |
| 5,278,009 | 1/1994 | Iida et al. | 359/68 |

FOREIGN PATENT DOCUMENTS

| | | |
|---|---|---|
| 0333392 | 9/1989 | European Pat. Off. |
| 1142533 | 6/1989 | Japan . |
| 2091468 | 7/1992 | United Kingdom . |

Primary Examiner—William L. Sikes
Assistant Examiner—Kenneth Parker
Attorney, Agent, or Firm—John C. Fox

[57] ABSTRACT

A matrix liquid crystal display device of the kind having a light shielding matrix (18) in the form of a grid of electrically conductive material carried on the same plate (11) as one set of address conductors (20) and separated therefrom by an insulating layer (21), further includes a feedback circuit arrangement, comprising for example a high gain differential amplifier (40), connected to the matrix which is responsive to voltages on the matrix to apply a correcting voltage tending to maintain the matrix at a predetermined potential, e.g. ground, whereby cross-talk effects due to capacitive couplings between the matrix and the address conductors are reduced.

7 Claims, 3 Drawing Sheets

LIQUID CRYSTAL DISPLAY WITH BLACK MATRIX HELD AT A FIXED POTENTIAL WITH A FEEDBACK CIRCUIT

BACKGROUND OF THE INVENTION

This invention relates to a liquid crystal display device comprising a row and column array of liquid crystal display elements defined between two plates which respectively carry sets of row and column address conductors, and a light shielding matrix of electrically conductive material in the form of a grid having portions extending between the display elements which is carried on one of the plates and electrically insulated from the set of address conductors on that plate.

Liquid crystal display devices can employ a matrix of light shielding material to improve display quality. Such a matrix is commonly referred to as a black matrix and consists of a light blocking layer which is patterned in a grid form having strip portions, i.e. sections, which border the display elements and usually slightly overlap the display elements around their edges. The grid prevents un-modulated light from between the display elements degrading the display performance, thereby improving contrast. A metal is preferable as the material of the matrix layer since it reflects rather than absorbs light energy and can be provided as a comparatively thin film.

Liquid crystal display devices of the kind having sets of row and column address conductors carried on separate plates can be of the passive variety in which the display elements are formed simply at the cross-overs between the row and column conductors or of the active matrix variety in which one plate carries a row and column array of display element electrodes which are connected to respective address conductors on that plate, usually the row address conductors to which scanning signals are applied, via two terminal non-linear devices such as diodes or MIMs. The other plate carries the matrix of light shielding material together with the other set of address conductors, i.e. the column address conductors to which data signals are applied, each of which extends over an associated column of display element electrodes.

A problem commonly experienced in such liquid crystal display devices which can significantly impair their performance, particular in larger area displays, is that of cross-talk. Cross-talk can occur both horizontally and vertically within the display picture.

Especially horizontal cross-talk can be a serious problem and has been found to be difficult to remove. This is particularly the case with display devices which use a metal black matrix.

OBJECTS AND SUMMARY OF THE INVENTION

It is an object of the present invention to provide a liquid crystal display device of the kind described in the opening paragraph in which the effects of cross-talk, and particularly the aforementioned horizontal cross-talk, are reduced.

According to the present invention, a liquid crystal display device of the kind described in the opening paragraph is characterised in that the display device includes a feedback circuit arrangement connected to the matrix which is responsive to a change in the voltage on the matrix so as to apply a correction voltage to the matrix which tends to maintain the matrix at a predetermined potential level.

A significant reduction in cross-talk effects is obtained with this display device in operation compared with a similar display device using a conductive black matrix which is electrically isolated. The invention stems from a recognition that the use of a conductive and electrically isolated black matrix is contributory to the occurrence of cross-talk and especially horizontal cross-talk in active matrix display devices in which the light shielding matrix is provided on the plate carrying the set of column conductors to which data signals are applied. Such cross-talk is now believed to be caused by coupling of the data signals between column conductors via the matrix. The voltage on a column conductor then depends to some extent on the data signals provided to other column conductors. In operation signals on the column conductors are coupled onto the matrix via the overlap capacitance. Because the resistance of the matrix is low in comparison to the impedance of overlap capacitance there is little variation in the signal level on the matrix over its area. As a result the voltage on the matrix represents some average of the signals on all the column conductors. The display element voltage $V_p$ is determined by the potential divider action of the resistance of the column conductor and the overlap capacitance. Since the column conductor resistance has a finite value the display element voltage will be influenced by the matrix voltage and therefore the signals on the other column conductors in the display device. This results in horizontal crosstalk.

In the display device of the present invention this problem of cross-talk is overcome by means of the feedback circuit arrangement which, by sensing signals coupled onto the matrix during operation and applying a correction signal to compensate, tends to cancel out the coupled signals.

An important advantage in using a feedback circuit arrangement in this way is that it conveniently enables the desired results to be achieved regardless of the fact that interconnection resistances with the matrix may be significant. Moreover, unwanted spurious signals appearing on the matrix are rapidly removed as a result of the feedback circuit. The feedback circuit arrangement preferably comprises a differential amplifier having an input and an output which are connected to the matrix. The feedback circuit arrangement can be provided simply and at low cost using for example an op-amp. It is not necessary to minimise the resistance of the connections between the amplifier's input and output circuit and the matrix as a comparatively high connection resistance simply increases the amplitude of the correction signal produced by the amplifier. The effectiveness of the feedback circuit arrangement increases according to the gain of the amplifier so a high gain amplifier is particularly beneficial. In an alternative arrangement, an inverting amplifier could be used.

The input and output of the amplifier may be connected to the same point or spaced points on the matrix. Preferably the output is connected to a plurality of spaced points on the matrix. For example, the amplifier's input may be connected to one corner of the matrix and its output connected to the other three corners. By supplying the correction voltage to a plurality of different points on the matrix the performance of the feedback circuit arrangement in reducing cross-talk is improved. Taking into account the resistive properties of the matrix, such multiple connections serve to ensure that the resistance between any point on the matrix and the correction voltage is maintained low. Moreover, the resistance between the output of the amplifier and points on the matrix is effectively reduced so that lower amplitudes of correction voltages are possible.

For even greater effectiveness, the display device preferably further includes a conductive band extending around and connected to the periphery of the matrix and to which the feedback circuit is connected, the band having a resistance per unit length which is lower than that of the matrix. For convenience of fabrication, the band may be of the same material as, and integral with the matrix, and in this case the band has a width greater than that of the portions of the matrix for at least most of its length. This arrangement also ensures good electrical connection between the band and the matrix. The band could alternatively comprise a layer of different material which overlaps and contacts the matrix at its periphery. The band serves to minimise the resistance between any two points on the matrix.

There is described in the English language abstract of JP-A-1-142533 a liquid crystal display device of the passive type in which X and Y electrodes are carried on respective plates and which includes a conductive meshed electrode provided on one plate and separated from the electrodes on that plate by an intervening layer of insulating material, which conductive meshed electrode is connected to ground. It is to be noted, however, that the intended purpose of such grounding is solely to attenuate high frequency electromagnetic noises emanating from the display device, in similar manner to electromagnetic radiation shields applied to CRT faceplates. There is no suggestion that grounding the meshed electrode could have any effect in reducing cross-talk problems. In any event, the meshed electrode is shown as being simply connected at one point to ground potential and as such the arrangement would not be expected to provide a significant reduction in cross-talk effects.

The invention allows preferred kinds of conductive materials, e.g. metals such as chromium or aluminium, to be used for the matrix without the kind of cross-talk problems experienced hitherto. This is especially important in active matrix display devices for use in projection systems. Although the invention is particularly beneficial for active matrix display devices, it is envisaged that it can also be used to advantage in passive display devices.

BRIEF DESCRIPTION OF THE DRAWINGS

Liquid crystal display devices in accordance with the present invention will now be described, by way of example, with reference to the accompanying drawings, in which.

It should be understood that the Figures are merely schematic and are not drawn to scale.

DESCRIPTION OF THE PREFERRED EMBODIMENTS

Figure 1:
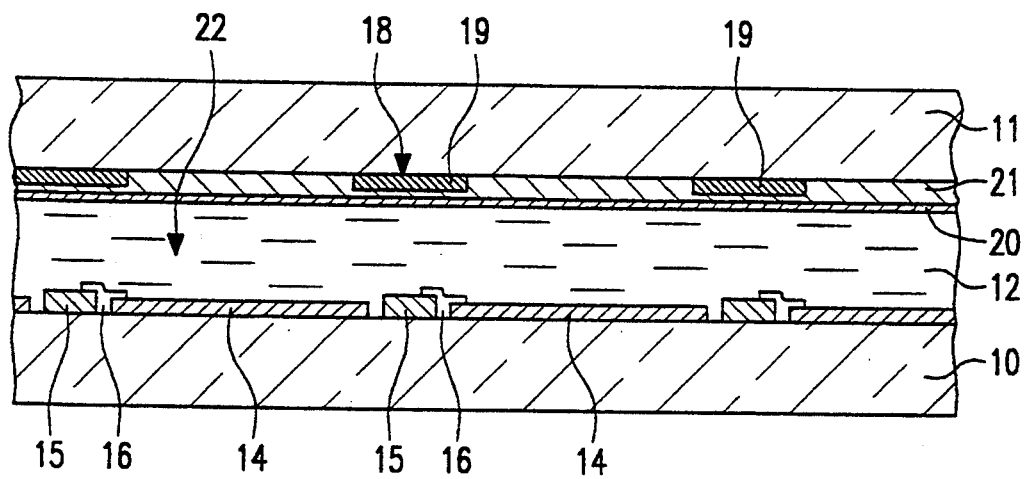
FIG. 1 is a schematic cross-sectional view through a typical part of a display device according to the present invention.

Referring to FIG. 1, the display device comprises a display panel having two plates 10,11 of transparent insulating material such as glass between which liquid crystal material 12 is contained. The plate 10 carries on its inner surface a set of generally rectangular and transparent display element electrodes 14, for example of ITO, arranged in a row and column array defining a rectangular display area and a set of row address conductors 15 extending between adjacent rows of the electrodes 14. The display element electrodes 14 of a row are connected to an associated row address conductor 15 via one or more respective two terminal nonlinear devices 16, which in this example comprise MIM devices although other devices known in the art, such as diode rings, can be used.

The plate 11 carries on its inner surface a matrix 18 of conductive light shielding material comprising a metal such as chromium or aluminium forming a grid defined by individual strip portions 19, i.e. sections, extending in the row and column directions. Viewed from above, the portions 19 surround each of the display element electrodes 14 with those portions extending in the row direction, as seen in FIG. 1, overlying the row address conductors 15 and MIM devices 16. The light shielding matrix 18, hereinafter referred to as the black matrix, and regions of the surface of the plate 11 between the portions of the matrix, are covered by a continuous layer of transparent insulating material 21 such as silicon nitride on whose surface a set of transparent column address conductors 20, for example of ITO, are provided extending at right angles to the address conductors 15. Each column conductor 20 overlies a respective column of display element electrodes 14, the width of the conductor 20 substantially corresponding to that of the electrodes 14. Conventional liquid crystal orientation layers cover the structures on the inner surfaces of plates 10 and 11 and polariser layers are provided on their outer surfaces in known manner, although these layers are omitted from FIG. 1 for simplicity. Individual display elements 22 in a row and column array are thus constituted by the electrodes 14, the overlying sections of the associated column conductors 20 and the liquid crystal material therebetween.

Figure 2:
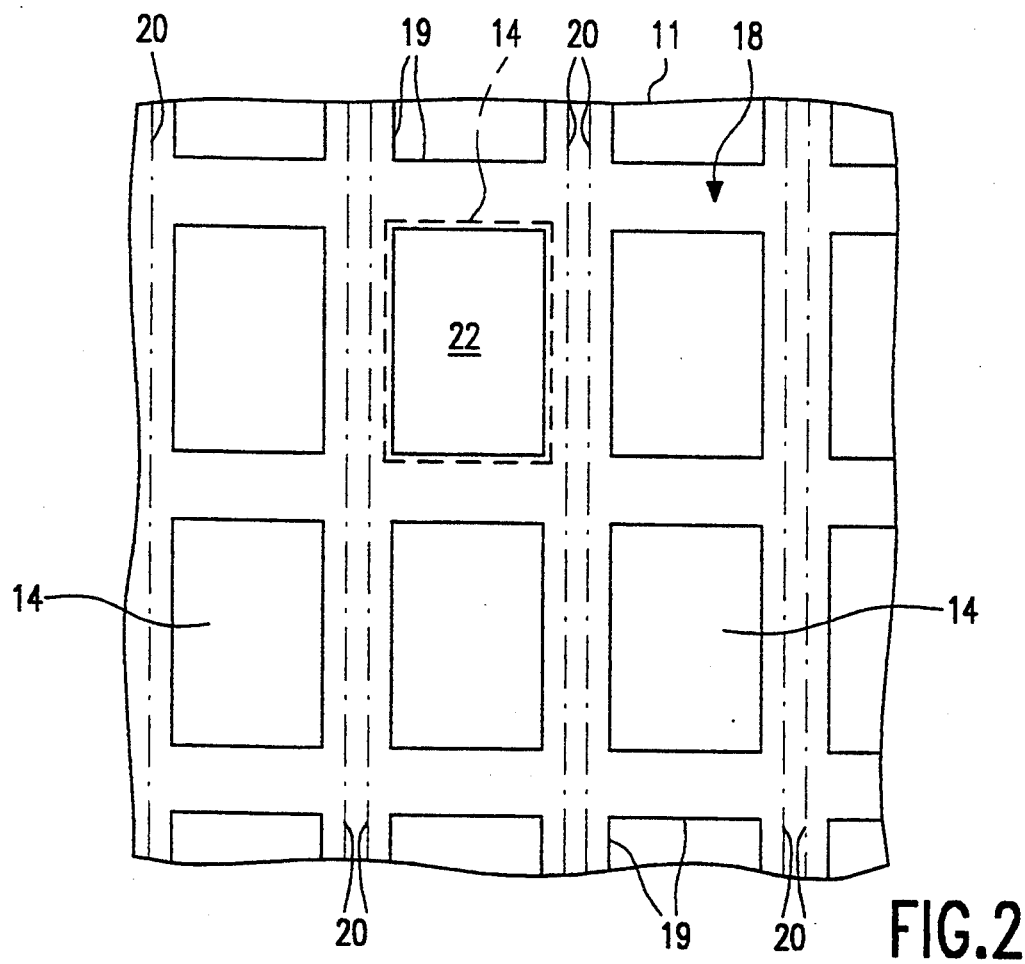
FIG. 2 is a plan schematic view of part of the display device illustrating particularly the arrangement of the column conductors and the light shielding matrix.

FIG. 2 is a plan view of the display device showing more clearly the structure of the black matrix 18 and its relationship with the set of column address conductors and display element electrodes 14. The individual portions 19 constituting the grid structure of the matrix consist of linear strips of constant width and define rectangular width and define rectangular apertures aligned with, and slightly smaller in area than, the electrodes 14, a representative one of which is shown in dotted outline. As can be seen, the portions 19 of the matrix 18 extending in the column direction slightly overlap facing edge portions of adjacent column conductors 20 and the column address conductors 20 completely overlie the portions 19 extending in the row direction.

The display device is manufactured and operated in a conventional manner as described for example in EP-A0333392 and GB-A-2091468.

Figure 3:
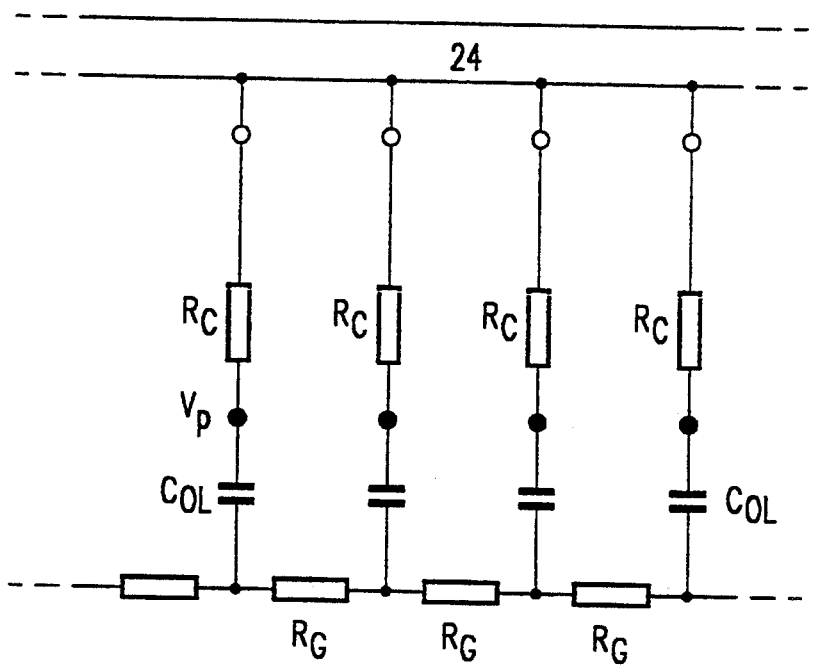
FIG. 3 is a simplified electrical equivalent circuit of a part of the display device for illustrating its electrical behaviour in a situation where the matrix is electrically isolated and allowed to float.

The use of a metal for the black matrix 18 is preferred as metals operate in a reflective rather than absorptive manner. Non-conductive, light absorbing materials suffer from the disadvantages that by absorbing light energy they heat up and consequently degrade the performance of the display device, particularly in the case of devices used in projection systems, and that they are comparatively thick. As previously discussed, it has been determined that a metal black matrix can be a significant cause of horizontal cross-talk effects if it is provided as an electrically isolated layer as data signals are coupled between column conductors via the black matrix and consequently the voltage on any column conductor may then depend to some extent on the data signals applied to other column conductors. In the case for example of a display device displaying a black square on a uniform light background, this cross-talk results in errors in the brightness of the display and manifests itself as less bright regions to either side of the black square. FIG. 3 illustrates a simplified two dimensional electrical equivalent circuit for a typical part of the kind of structure on the plate 11 of the display device of FIGS. 1 and 2 in the case where the black matrix is electrically isolated and allowed to float. The resistors $R_G$ represent the horizontal conduction paths within the black matrix 18 and $C_{OL}$ represents the overlap capacitance between the metal of the matrix 18 and the column conductors 20. The resistance of the column conductors and the lead-in from the column driver circuit, 24, is indicated by $R_C$. $V_p$ indicates a voltage equivalent to the voltage on a column conductor and determines the voltage applied to a display element when it is addressed. With the display device driven using a line inversion drive scheme, alternating data voltages representing the video information are produced by the column driver circuit, typically at a frequency of 15 kHz, and these signals on the column conductors are coupled onto the black matrix via the overlap capacitance. Because the resistance of the matrix is low in comparison to the impedance of $C_{OL}$ there is little variation in the signal level on the grid across the display. As a result the voltage on the matrix represents some average of the signals on all the column conductors of the display. The display element voltage $V_p$ is determined by the potential divider action of $R_C$ and $C_{OL}$. Since the column conductor resistance has a finite value the display element voltage will be influenced by the matrix voltage and therefore the signals on the other column conductors in the display, thus producing horizontal crosstalk.

In order to prevent this effect, the black matrix 18 of the display device is connected to a feedback circuit arrangement. which is responsive to changes in the voltage on the matrix so as to apply a correction voltage to the matrix tending to maintain the matrix at a predetermined potential level, for example ground.

Figure 4:
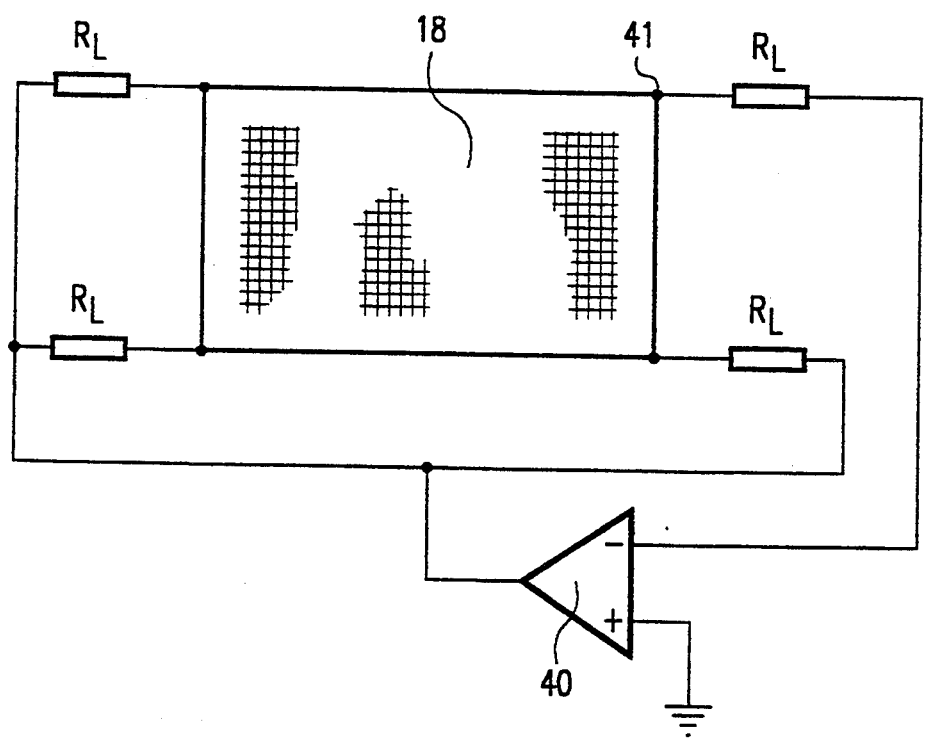
FIG. 4 shows schematically a first embodiment of a light shielding matrix and feedback circuit arrangement connected thereto as used in the display device.

FIG. 4 illustrates schematically the electrical circuit configuration of one embodiment of the matrix and the feedback circuit arrangement. The feedback circuit arrangement comprises a high gain differential amplifier 40, such as an op-amp for convenience, whose inverting input is connected via a conductive lead to one corner 41 of the black matrix 18 and whose other input is connected to ground. The output of the amplifier 40 is connected via conductive leads to a plurality of points on the matrix, namely to each of the three other corners of the matrix, so as to minimise the resistance between any point on the matrix and the correction voltage, bearing in mind the resistive properties of the matrix. The feedback circuit arrangement operates to sense voltage signals coupled onto the black matrix 18, via the input connection to the one corner 41, and to generate compensating voltages according to the sensed voltages which are supplied to the matrix. The amplifier has a high input impedance and so the lead-in resistance has little effect on the matrix voltage signal fed to its input. The output correction voltage generated by the amplifier represents the difference between the matrix voltage and ground. This error signal voltage is fed to the three other corners of the matrix and because of the inversion of the amplifier tends to cancel out signals coupled from the column conductors onto the matrix thereby maintaining the matrix at or close to ground. If the matrix voltage rises due to coupling of the data signals on the column conductors, the voltage at the inverting input of the amplifier 40 rises correspondingly and thus causes the amplifier output voltage to fall, the change being fed back to the matrix to cancel out the initial increase in voltage. There is inevitably some inherent resistance in the connections between the amplifier 40 and the matrix 18 and these are represented for simplicity by the resistors $R_L$ in FIG. 4. The use of this feedback circuit arrangement enables the matrix voltage to be held substantially at ground potential even if the values of $R_L$ are relatively high. The effect of an increase in $R_L$ is simply to increase the magnitude of the compensating voltage produced by the amplifier 40 since more of this voltage is dropped across $R_L$.

Figure 5:
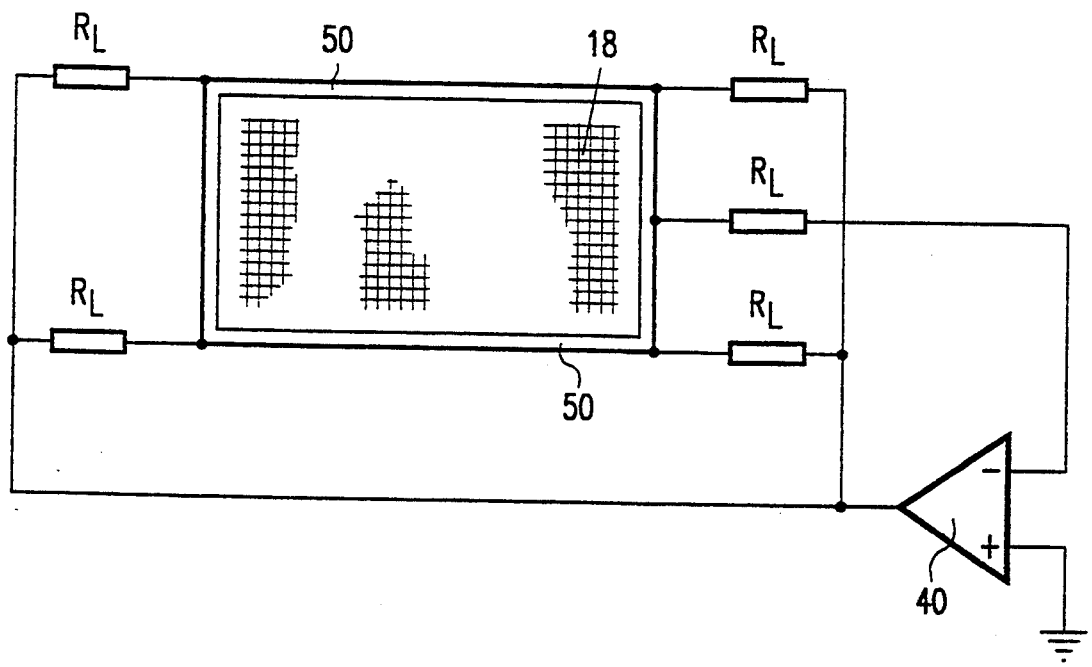
FIG. 5 shows schematically a second embodiment of a light shielding matrix and feedback circuit arrangement connected thereto.
Figure 6:
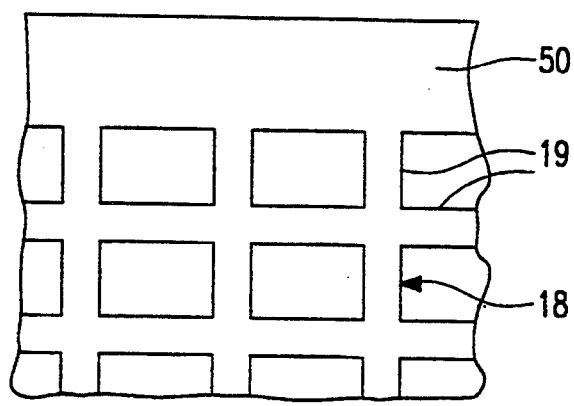
FIG. 6 shows enlarged a typical edge portion of the matrix of FIG. 5.

This feedback circuit arrangement results in a substantial reduction of cross-talk voltages compared with a similar display device in which the conductive matrix is left electrically isolated. A still greater reduction in cross-talk effects can be expected if the matrix resistance is reduced. FIG. 5 illustrates a second embodiment of black matrix and feedback circuit arrangement which provides an improvement in this respect. Referring to FIG. 5, the black matrix 18 is provided with a conductive band 50 extending around its periphery and connected electrically with the ends of the strip portions 19 at its edges. The band has a resistance per unit length which is less than that of the portions 19 of the matrix. An enlarged fragmentary view of an edge part of the structure is shown in FIG. 6. The band 50 is carried on the plate 11 and extends continuously around the periphery of the black matrix 18 outside the rectangular display area. The band is formed unitarily with the matrix 18 from the same deposited layer of metal so that a continuous structure is obtained, and has a width which is greater than the width of the strip portions 19 constituting the matrix, at least for most of its length. The width of the band 50 need not be constant. In an alternative embodiment, the band could be formed from a separately deposited layer of conductive material different to that of the matrix which overlaps and contacts the edges of the matrix 18. If the material used is less resistive or the thickness of the band layer is increased, it may not be necessary for the band to have a greater width.

The band 50 is connected to the amplifier input at a point 51 mid-way between two corners. The amplifier output is connected to each of the four corners of the band, again to minimise the resistance between any point on the matrix and the connection voltage. The connection points could instead be as shown in FIG. 4 for example. The inherent resistance of each connection is again denoted by the resistors $R_L$. The band 50 helps to ensure that the resistance between any points in the matrix is kept low.

By way of example of typical dimensions and values of components used for the embodiments of FIG. 5, the resistivity of the column conductors 20 (ITO) is 50 ohms/square, the resistivity of the black matrix (chromium) is 5 ohms/square, the column conductor lead-in resistance is 5K ohms/column, and the connection resistances, $R_L$, are 10 ohms. The insulator layer 21 has a thickness of 2 micrometers and a relative permittivity of 6. The band 50 has a width of 2 mm and the linear portions 19 of the matrix have a width of forty micrometers. The column conductors 20 have a width of 150 micrometers and the conductor/metal matrix overlap between columns is five micrometers. All the above dimensions and electrical values are approximate. The level of horizontal cross-talk obtained is almost two orders of magnitude lower than that obtained when the matrix is allowed to float. A slightly less reduction is obtained for the FIG. 4 embodiment.

Various modifications are possible, as will be apparent to persons skilled in the art. For example, the feedback circuit arrangement could operate to maintain the matrix close to a potential other than ground. Also the number of connections of the amplifier output to the matrix may be varied. Two connections, or possibly just one, may be sufficient in certain structures, and the amplifiers input and output could be connected to the same point on the matrix. Furthermore, the band 50 in the FIG. 5 embodiment need not be continuous.

The layout of the display elements may be staggered in known manner such that the display elements in a given row are displaced laterally by half a display element with respect to immediately adjacent rows. In this case, the pattern of the grid structure of the black matrix is correspondingly changed.

Although the above-described display device is of the active matrix kind, the invention can also be used to advantage in passive liquid crystal display devices in which the row conductors are of similar width to the column conductors and individual display elements are defined at the regions of the intersections between the row and column conductors.

I claim:

1. A liquid crystal display device comprising a row and column array a row and column array of liquid crystal display elements defined between two plates which respectively carry sets of row and column address conductors, and a light shielding matrix of electrically conductive material in the form of a grid having portions extending between the display elements which is carried on one of the plates and electrically insulated from the set of address conductors on that plate, characterised in that the display device includes a feedback circuit arrangement connected to the matrix which is responsive to a change in the voltage on the matrix so as to apply a correction voltage to the matrix which tends to maintain the matrix at a predetermined potential level.

2. A liquid crystal display device according to claim 1, characterised in that feedback circuit arrangement comprises a differential amplifier whose input and output are connected to the matrix.

3. A liquid crystal display device according to claim 2, characterised in that the output of the amplifier is connected to a plurality of spaced points on the matrix.

4. A liquid crystal display device according to claim 3, characterized in that a conductive band is provided extending around and connected to the periphery of the matrix to which the feedback circuit arrangement is connected, the band having a resistance per unit length which is lower than that of the portions of the matrix.

5. A liquid crystal display device according to claim 1, characterised in that a conductive band is provided extending around and connected to the periphery of the matrix to which the feedback circuit arrangement is connected, the band having a resistance per unit length which is lower than that of the portions of the matrix.

6. A liquid crystal display device according to claim 5, characterised in that the band is of the same material as, and integral with, the matrix and has a width which is greater than that of the portions of the matrix for at least most of its length.

7. A liquid crystal display device according to claim 2, characterized in that a conductive band is provided extending around and connected to the periphery of the matrix to which the feedback circuit arrangement is connected, the band having a resistance per unit length which is lower than that of the portions of the matrix.

* * * * *